United States Patent
Campagne et al.

(10) Patent No.: US 8,712,604 B2
(45) Date of Patent: Apr. 29, 2014

(54) METHOD AND DEVICE FOR ACCESSING THE DOCUMENTATION OF AN AIRCRAFT ACCORDING TO ALARMS GENERATED THEREIN

(75) Inventors: Pierre Campagne, Toulouse (FR); Jerome Treanton, Toulouse (FR); Xavier Geay, Tournefeuille (FR); Laval Louis Chan Kam Fai, Fonsorbes (FR); Christophe Jotz, Saint Clar de Riviere (FR); Thierry Paya-Arnaud, Gagnac sur Garonne (FR); Jerome Pouyfaucon, Toulouse (FR)

(73) Assignees: Airbus S.A.S., Blagnac (FR); AIRBUS Operations S.A.S., Toulouse (FR)

( * ) Notice: Subject to any disclaimer, the term of this patent is extended or adjusted under 35 U.S.C. 154(b) by 345 days.

(21) Appl. No.: 12/879,639

(22) Filed: Sep. 10, 2010

(65) Prior Publication Data
US 2011/0160936 A1    Jun. 30, 2011

(30) Foreign Application Priority Data
Sep. 11, 2009   (FR) ...................................... 09 56243

(51) Int. Cl.
*G06F 17/30* (2006.01)
*G06F 11/32* (2006.01)
*G05B 23/02* (2006.01)

(52) U.S. Cl.
CPC ............ *G06F 11/321* (2013.01); *G05B 23/027* (2013.01)
USPC ............................................. 701/3; 701/31.8

(58) Field of Classification Search
CPC ........................... G05B 23/027; G06F 11/321
USPC ......... 701/3, 31.8, 33.4, 36; 702/185; 714/25, 714/26, E11.029; 340/945, 963; 370/401, 370/463; 707/695, 317.032; 709/217, 224, 709/225, 230
See application file for complete search history.

(56) References Cited

U.S. PATENT DOCUMENTS 3,678,256 A * 7/1972 Harenberg, Jr. .................. 701/16
6,606,544 B2 * 8/2003 Glenn et al. ........................ 701/3
(Continued)

FOREIGN PATENT DOCUMENTS

FR    2 917 521 A1    12/2008

OTHER PUBLICATIONS

Anonymous, "Diagnostics Hyperlink to Online Service Manual", Research Disclosure, Mason Publications, vol. 469, No. 19, May 1, 2003, XP 007132578, 2 pages.*

(Continued)

*Primary Examiner* — Marthe Marc-Coleman
(74) *Attorney, Agent, or Firm* — Oblon, Spivak, McClelland, Maier & Neustadt, L.L.P.

(57) ABSTRACT

A method and a device for accessing the documentation of an aircraft according to alarms generated therein, where the documentation includes at least one document that is modifiable independently of the manufacturer of the aircraft. After having received at least one indication relating to at least one alarm generated by the avionics of the aircraft, at least one datum relating to the at least one alarm, including a link to at least one element of the documentation, is extracted and displayed.

20 Claims, 5 Drawing Sheets

(56) References Cited

U.S. PATENT DOCUMENTS

| | | | |
|---|---|---|---|
| 6,959,235 B1* | 10/2005 | Abdel-Malek et al. | 701/29.4 |
| 7,305,629 B2* | 12/2007 | Barsness et al. | 715/788 |
| 2002/0165647 A1* | 11/2002 | Glenn et al. | 701/3 |
| 2003/0080256 A1* | 5/2003 | Urnes et al. | 244/194 |
| 2003/0167111 A1* | 9/2003 | Kipersztok et al. | 701/29 |
| 2005/0144183 A1* | 6/2005 | McQuown et al. | 707/100 |
| 2006/0112119 A1* | 5/2006 | Vian et al. | 707/101 |
| 2007/0219676 A1* | 9/2007 | Allen et al. | 701/3 |
| 2010/0152924 A1* | 6/2010 | Pandit et al. | 701/3 |

OTHER PUBLICATIONS

French Search Report issued Aug. 26, 2010 in French Application No. 0956243.

Patricia M. McCown et al., "Auxiliary Power Unit Maintenance Aid-Flight Line Engine Diagnostics", Sep. 25, 1989, XP 010079548, pp. 296-301.

Carl Lloyd, "Document Engineering" Jan. 1, 2001, XP 006523811, pp. 7/1-7/6.

* cited by examiner

METHOD AND DEVICE FOR ACCESSING THE DOCUMENTATION OF AN AIRCRAFT ACCORDING TO ALARMS GENERATED THEREIN

CROSS-REFERENCE TO RELATED APPLICATIONS

This application claims the benefit of foreign priority to FR 09 56243 filed Sep. 11, 2009.

BACKGROUND

This invention relates to the documentation of aircraft and more particularly to a method and a device for accessing the documentation and performance of an aircraft according to alarms generated therein.

For making a flight, the crew of an aircraft has documents carried along on board the aircraft or directly available inside same. This type of documents comprises in particular the technical documentation of the aircraft, that is to say the description of the systems and the procedures, the tolerances, the list of minimum equipment items or MEL (acronym for Minimum Equipment List in English terminology) and the list of configuration deviations or CDL (abbreviation for Configuration Deviation List in English terminology), the company operational documentation (criteria for choice of an airport for diverting, crew work rules, etc.), performances (take-off, landing and in flight) as well as navigation and airfield charts.

It is observed here that aircraft performances are provided, for certain families of aircraft, in the FCOM (acronym for Flight Crew Operating Manual in English terminology) Vol. 2/3, in the QRH (acronym for Quick Reference Handbook in English terminology) or in specific documents such as take-off restrictions sheets.

Moreover, the pilot uses documents specific to each flight such as the flight record comprising, in particular, the flight plan and the weather charts for the route.

Hereinafter, it is considered that the operational documentation relates to all the documentation available on board an aircraft and connected with same, in particular the FCOM and the MEL as well as that connected with the company operating this aircraft and that necessary for calculation of performances of the aircraft in take-off and landing.

The operational documentation may be in a paper or electronic format. When it is in an electronic format, it may in particular be accommodated on a special data-processing platform incorporated into the aircraft but forming part of a domain referred to as open to which the company has access freely and which it may modify, unlike the avionic domain in which each modification generally is subject to the approval of the manufacturer of the aircraft.

Furthermore, each aircraft is equipped with an alarm system called FWS (abbreviation for Flight Warning System in English terminology) capable of detecting failures or abnormal configurations in order to warn the crew by virtue of the generation of visual and/or acoustic warnings and the display of procedures to be carried out and the state of the aircraft (list of inoperative systems, performance limitations, etc.) via a warning display system.

Such an alarm system forms part of the avionics of the aircraft.

When the FWS detects the failure of a system, the procedure that the pilot is to follow then is displayed on a screen. After the detection of this failure, the copilot, called Pilot Non-Flying, performs the required actions displayed on this screen.

When all the required actions have been performed and, therefore, the procedure no longer is displayed, the pilot then may consult his operational documentation, if time permits. This consultation generally is optional. It provides the pilot with additional information items regarding the impact of the failure. In this way, he has all the information items necessary for analyzing the situation and making the best possible decision concerning continuation of the mission and/or preparation for a following flight.

For these purposes, several manuals may be consulted. The order of consultation depends on the situation of the aircraft. Thus, generally and by way of illustration, if the aircraft is on the taxiway en route for the take-off, the MEL is to be consulted first. The pilot then may consult the FCOM.

Paper operational documentation requires the pilots to have a good knowledge of the structure of the manuals in order to rapidly access the sought information. When the page associated with the failure has been identified according to the structure of the manual in which the information is sought, the pilot consults the detailed information items relating to the procedure that he has just followed on the screen.

If it is deemed that the failure will not be repaired during the next stopover, the pilot may consult the MEL in order to evaluate the impact of the failure on the next mission. Through the various pages of this manual, the pilot may determine the flight conditions for the next mission as well as the various special operational procedures that he is to follow. In other words, consulting the MEL enables him to determine whether the current state of the aircraft is compatible with the next mission.

Furthermore, if the failure of the system affects the performances of the aircraft on landing, the pilot must find the information items necessary for calculation of the impact of the failure. These generally are available in the QRH.

If the failure affects the take-off, it is the MEL that will provide this indication.

Figure 1:
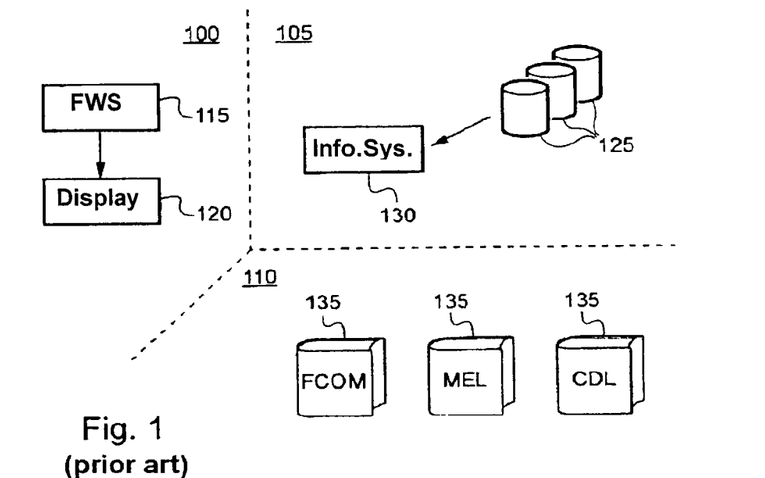
FIG. 1 schematically illustrates an exemplary environment in an aircraft, where the warnings are managed and where the corresponding documentation may be accessed.

FIG. 1 schematically illustrates an exemplary environment, in an aircraft, where the warnings are managed and where the corresponding documentation may be accessed. This system here comprises three separate parts: avionic environment 100, data-processing environment referred to as open 105 and environment 110 of documentation available in a paper format.

As indicated above, avionics 100 comprises in particular an FWS 115 for detecting failures or anomalies as well as a warning display system 120 for displaying the procedures to be performed when alarms are generated as well as the state of the aircraft.

The data-processing environment referred to as open 105 comprises an open on-board information system 130 to which there is connected a database 125 in which the operational documentation, or a part thereof, is stored. The open on-board information system makes it possible to consult the electronic documentation stored on aboard the aircraft, for example with the aid of key words. Although these documents generally are structured in hierarchic form, from thousands of documentary units, it is not necessary, here (with the aid of key words), to know the structure of the document in which information items are sought.

Finally, environment 110 of documentation available in a paper format comprises manuals 135 such as the FCOM, the MEL and the CDL.

If the pilot uses the paper format, he must know the source of the information that he is seeking in the multiple documentations that he has available to him on board the aircraft. The first action that the pilot must perform is therefore to select the operational manual in which to go and look for the information. When he thinks he knows in which document to look for his information, he must know the structure of the manual in order to go to the information as quickly as possible. It therefore is necessary for the pilot to have a good knowledge of his operational documentation.

Furthermore, the search for pertinent information in all the operational documentation is a tedious and lengthy task for the pilot and, therefore, reduces his resourcefulness. It is observed that, furthermore, it may be necessary to combine information items originating from several manuals in order to determine the operational impacts of an alarm, particularly in the case of performance calculation.

Finally, it is observed that the pilot's task increases when several alarms are generated simultaneously, each having to be processed one after the other but possibly having additional operational impacts when they are combined with each other.

The use of a documentation in electronic format with the aid of key words allows the pilot to free himself from knowledge of the documentary structure and the use of performance diagrams in order to take the impact of a failure into account, because search means, in particular by key words, or the direct selection of a failure facilitate access to the information.

Nonetheless, the pilot always must identify each failure detected, and an oversight on his part may contribute to a faulty assessment of the impacts of the failure on the aircraft, in particular on the performances at take-off and landing.

BRIEF SUMMARY

Therefore there is a need to improve the systems for access to the documentation in an aircraft.

The invention makes it possible to resolve at least one of the problems set forth above.

The invention thus has as an object a computer method for access to the documentation of an aircraft in the said aircraft, the said documentation comprising at least one document modifiable independently of the manufacturer of the said aircraft, this method comprising the following steps, receiving at least one indication relating to at least one alarm generated by the avionics of the said aircraft; and extracting and displaying at least one datum relating to the said at least one alarm, the said at least one datum comprising a link to the at least one element of the said documentation.

In this way, the method according to the invention makes it possible to contextualize the operational documentation in an aircraft to bring an additional interactivity into the cockpit. This interactivity enhances the incorporation of the information system by providing a rapid and easy access to the information items relating to the current flight context, according to a failure detected by an alarm computer. These information items allow a pilot a better understanding and knowledge of the systems of the aircraft, a better analysis of the current state of the aircraft, a better analysis of the operational impacts of a failure, a better look-ahead to behavior at the end of the mission in progress and a better look-ahead at the next mission. In this way, these information items facilitate the pilot's task in busy situations and eliminate the need to know the structure of the operational documentation.

According to a particular embodiment, the method further comprises the following steps, identifying at least one part of at least one document of the said documentation relating to the said at least one alarm according to the said at least one indication received; and, accessing the said at least one part of the said at least one document.

In this way, the method according to the invention makes it possible to directly access a part of the documentation relating to an alarm when the latter occurs.

The said at least one datum preferably is displayed among a plurality of data representing links to the said documentation, the said at least one datum being displayed in identifiable manner.

According to a particular embodiment, the method further comprises a step of authenticating the said at least one indication received for monitoring the validity of the indications received.

The said at least one indication is received via a unidirectional link in order to protect the avionics with regard to data originating from the open on-board information systems.

The said at least one datum preferably further comprises an information item relating to the conditions having led to the generation of the said at least one alarm making it possible to clarify the context.

The said documentation advantageously comprises at least one of the documents among an FCOM, a MEL, a CDL, a manual from the operator of the said aircraft and/or performance calculation elements.

The invention also has as an object a computer program comprising instructions adapted for the implementation of each of the steps of the method described above, when the said program is run on a computer.

The invention likewise has as an object a device comprising means adapted for the implementation of each of the steps of the method described above, as well as an aircraft comprising this device.

BRIEF DESCRIPTION OF THE SEVERAL VIEWS OF THE DRAWINGS

Other advantages, purposes and characteristics of this invention become apparent from the detailed description that follows, presented by way of non-limitative example, with reference to the attached drawings in which:

FIG. 5, comprising

DETAILED DESCRIPTION

In general, the invention allows the transmission of codes associated with the alarms generated by the FWS, being situated in the avionic domain of the aircraft, to applications accommodated in the data-processing domain referred to as open (open on-board information system).

By using these information items, the applications accommodated in the open on-board information system then provide the pilot with contextualized menus constituting the link to the pertinent documentation relating to the alarms generated and to the causes and/or consequences thereof. In this way, the system according to the invention makes it possible to provide a rapid and easy access to the pertinent "pages" of the operational documentation when failures are detected.

It is considered here that a document may be a passive informative content that may be presented, for example, in the form of text and/or predetermined diagrams, a dynamic informative content that also may be presented in the form of text and/or diagrams but at least one part of which is evaluated according to data received from the avionics or an interactive content making it possible to evaluate results according to data received from the avionics and data input by the user.

In an application called OPS LIBRARY, the crew has access, via a tab ECAM ALERTS, to the list of alarms generated by the FWS during the flight. Links displayed in this tab provide direct accesses to the "pages" of the operational documentation relating to the alarms.

Other applications, in particular performance calculation applications, use the information items relating to the alarms generated by the FWS for contextualizing the information items provided to the pilot, for example for contextualizing the landing performance calculation in the event of alarms having performance impacts.

According to a particular embodiment, a specific code is assigned to each alarm that may be generated by the FWS. A reliable and secured link is used for transmitting the codes corresponding to the alarms generated by the FWS from the latter to the open on-board information system that is capable of receiving such codes and making them available to all the documentation consultation or performance calculation applications.

Figure 2:
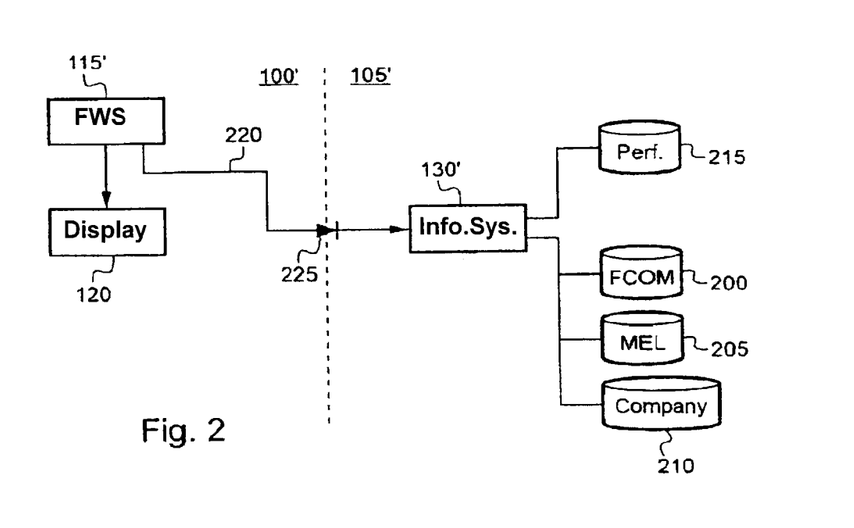
FIG. 2 schematically illustrates an exemplary environment in an aircraft, where the warnings are managed, this environment making it possible to access the operational documentation in pertinent manner, in accordance with the invention.

FIG. 2 schematically illustrates an exemplary environment in an aircraft, in which the alarms are managed, this environment making it possible to access the operational documentation in pertinent manner, in accordance with the invention. This system here comprises two separate data-processing environments: avionic environment 100' and data-processing environment referred to as open 105'.

In standard manner, avionics 100' here comprises, in particular, an FWS 115' for generating alarms according to failures or anomalies detected as well as a warning display system 120 for displaying the state of the aircraft as well as the procedures to be performed when alarms are generated.

FWS 115' here, however, is adapted for transmitting a code corresponding to the alarms generated.

The data-processing environment referred to as open 105' comprises an open on-board information system 130' to which there are connected here databases 200 to 215 in which the operational documentation, or a part thereof, is stored. More precisely, database 200 stores the FCOM documentation, database 205 stores the MEL documentation, database 210 stores the documentation of the airline company operating the aircraft and database 215 stores the documentation relating to performance calculations.

It should be noted here that the information items stored in databases 200 to 215 may be stored or distributed differently in several databases.

Data-processing environment referred to as open 105' is connected to avionic environment 100' by a unidirectional link 220 comprising a communication monitoring component 225 having a "diode"-type function. Component 225 makes it possible to monitor the exchange of information items between environments 100' and 105' in order to prevent data from the open on-board information system, forming part of the domain referred to as open, from being able to be transmitted to the avionics.

Link 200 allows the alarm computer to inform the electronic documentation system, in real time, of the occurrence or the activation of alarms. It also allows the alarm computer to inform, in real time, about the disappearance of an alarm. The data are updated in each calculation cycle of the alarm computer. The alarm computer thus transmits to the open on-board information system the identifying codes associated with the acoustic or visual warnings generated in each calculation cycle.

These codes advantageously are stored by the open on-board information system, for example in a buffer memory, from which they are accessible through the applications run by the open on-board information system.

Furthermore, in order to ensure the integrity of information items exchanged between the alarm computer and the open on-board information system, the open on-board information system advantageously authenticates the data received from the FWS. For these purposes, the alarm computer assigns a common identification number to each set of data sent and determines the number of information items sent. These information items are sent in each calculation cycle, in addition to the information items relating to the identified alarms. In this way the open on-board information system is able to validate the received data by checking the identification numbers and comparing the number of data received with the number indicated.

By way of illustration, the open on-board information system comprises a first OPS LIBRARY application for management of the documentation and a second LDG PERF application for performance calculation, these two applications being configured for taking into account the alarms generated by the FWS.

It should be observed here that since the documentation is subject to revision, it may be updated regularly. Likewise, the FWS may evolve in order to incorporate new functionalities or new monitorings.

To allow a correspondence between the codes originating from the FWS and the documentation managed by the open on-board information system despite the evolution of these systems, a process for creation of specific documentary units preferably is implemented.

During development of a new FWS standard, the team in charge of its development communicates the list of codes present in this standard and the corresponding alarms to the teams in charge of drawing up the various documents and/or producing the performance calculation application. This communication in particular may be effected through a database produced by a dedicated tool in the form of a set of XML (abbreviation for eXtensible Markup Language in English terminology) files.

During the phase of drawing up a documentation, for example the FCOM document, the authors reproduce, preferably in the chapter for abnormal procedures, all the procedures that are processed by the warning display system when alarms are generated by the FWS.

The authors input each alarm into a specific documentary unit mentioning the following information items:
- code for the alarm; and,
- links to the corresponding documentary units for the document considered.

Such a specific documentary unit may correspond to one or more alarms.

Each specific documentary unit created advantageously further comprises the following additional information items:
- the name associated with the alarm in the warning display system;
- the conditions that triggered the alarm; and,
- comments that in particular contribute to the understanding of the actions to be performed or the restrictions generated.

The performance calculation application is similarly modified in order to take into account the specific codes for each alarm.

Table 1 attached hereto illustrates an exemplary content of a documentary unit created for taking into account alarm codes received from the FWS. Each line here corresponds to an alarm.

As illustrated, the first column shows the code for the alarm considered, the second comprises the corresponding links to the documentary units concerned, the third comprises the conditions that triggered the alarm and the last comprises comments making it possible to explain the alarm and/or the actions to be undertaken.

The links preferably comprise a description allowing the pilot to determine the nature of the information items to which the link applies as well as the link itself. By way of illustration, the link ("FCOM", fcom-chap_3-sect_2-par_3) makes it possible to access, from the "FCOM" display, the page corresponding to the third paragraph of the second section of the third chapter of the FCOM document.

Links making it possible to access the documents preferably are formatted according to the operating system used by the open on-board information system. They therefore may represent paths and be defined, in relative or absolute manner, according to the locations of the intended documentary units in accordance with the hierarchic organization connected with storage thereof.

A database containing these documentary units used for establishing links between the alarm codes and the documentation preferably is published at the time of each revision of the operational documentation. It contains all the specific codes that show the relation between the documentary units and the alarms. This database is loaded into the aircraft at the same time as the revision of the documentation. It is used at the time of initiating the search for an alarm code.

Figure 3:
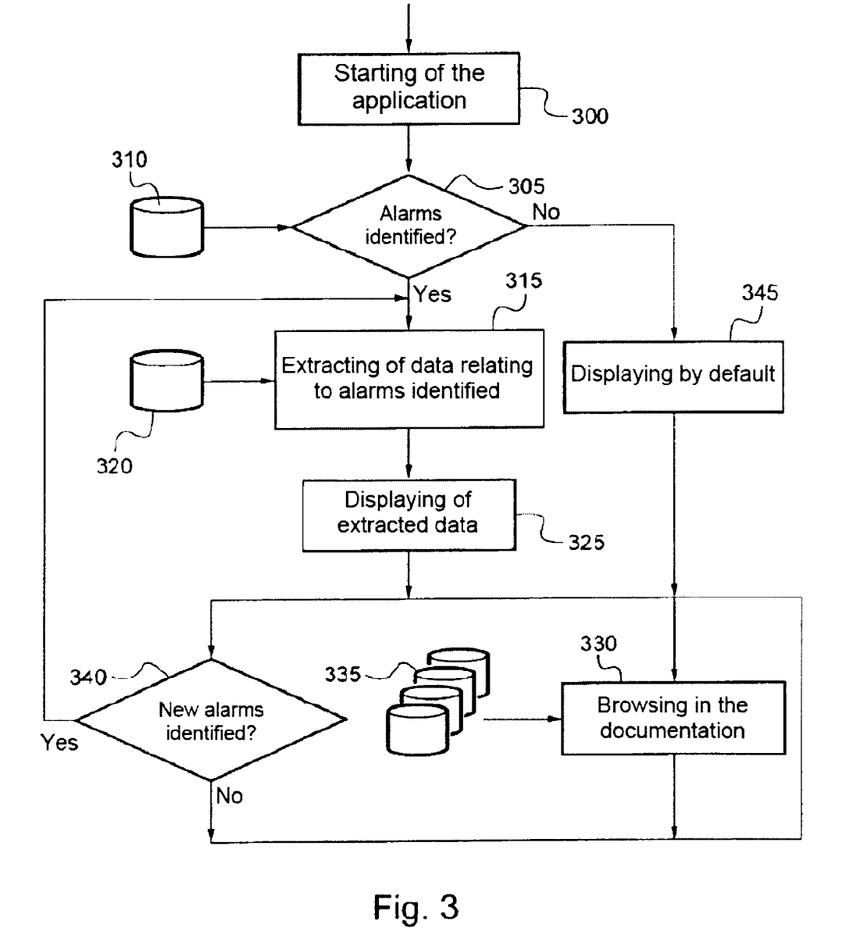
FIG. 3 schematically shows an example of certain steps of algorithms using the alarm codes received from the FWS and used by the open on-board information system.

FIG. 3 schematically illustrates an example of certain steps of algorithms using the alarm codes received from the FWS and used by the open on-board information system.

After the application has been started (step 300), a first step is intended to determine whether one or more alarms have been generated in the FWS (step 305). This step analyzes in particular the part of memory 310 of the open on-board information system in which the codes received for the alarms generated in the avionics are stored.

If one or more alarms have been generated in the FWS, the data relating to the codes for these alarms are extracted (step 315) according to the specific documentary unit or units stored in database 320 establishing the links between alarm codes and documentary units of the documentation of the aircraft.

At the end of this step, the extracted data are displayed (step 325) in order to allow the user to select and activate the links associated with these data and to browse in the documentation (step 330) stored in databases 335. As indicated above, the displayed information items comprise, for example, the name of the alarms generated, the conditions having generated them, comments on same and links making it possible to access information items relating thereto in the operational documentation.

If the object of the application run is a mere consultation of the documentation, the accessed documentation preferably comprises the FCOM, the MEL, the CDL and documents developed by the airline company operating the aircraft.

If, on the contrary, the object of the application run is a performance calculation, the documentation accessed corresponds to the performance calculation the values of which are initialized according to the alarms generated.

If no alarm has been generated, that is to say if no alarm code is present in memory 310, a display of the documentation by default is initialized (step 345) in order to allow browsing therein.

At the same time as the browsing in the documentation, the application analyzes the content of memory 310 in order to detect the presence of codes corresponding to new alarms (step 340). If one or more new alarms are identified, the preceding steps (steps 315 to 345) are repeated.

It is observed that when several alarms are identified, their processing generally is performed according to their order of occurrence. Moreover, a reference to the alarms processed by the applications of the open on-board information system preferably is stored by each of them in order to make it possible, on starting of these applications, to process as a priority those that have not yet been processed.

When alarms are generated by the FWS, that is to say when alarm conditions are detected by the FWS, the pilot processes them in the warning display system. Simultaneously, the FWS automatically transmits the corresponding alarm codes to the open on-board information system through the communication link established between the avionics and the open on-board information system.

After processing of the failure in the warning display system and at the opportune moment chosen by the pilot, the latter may analyze, from the open on-board information system, the impact of the failures having generated the alarms. This analysis is, for example, carried out in the operational documentation part through the OPS LIBRARY application. It also may be carried out in the LDG PERF application if there is an impact on the performance of the aircraft.

The LDG PERF application automatically retrieves the code for the alarm corresponding to a failure having a performance impact.

When the pilot starts the LDG PERF application making it possible to implement a calculation concerning landing performances, the application automatically retrieves the code for the alarms corresponding to a failure having a performance impact, for example an F/CTL PRIM 1 FAULT failure. The pilot then may implement performance calculations according to the failures detected.

Figure 4:
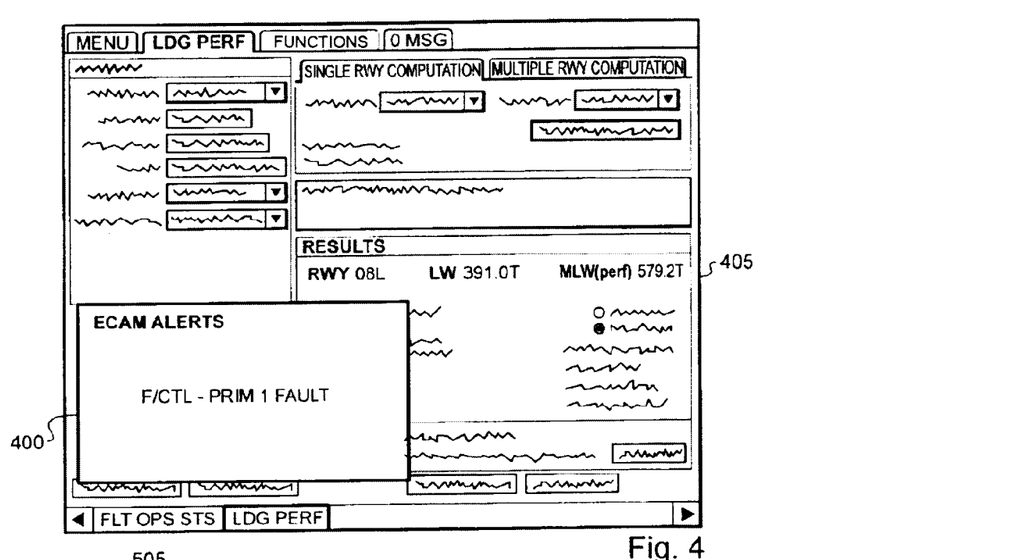
FIG. 4 illustrates an exemplary copy of a screen of the open on-board information system, showing the interface of an application for performance calculation when an alarm having a performance impact has been generated in the FWS.

FIG. 4 illustrates an example of a copy of a screen of the open on-board information system showing the interface of the LDG PERF application when the F/CTL PRIM 1 FAULT alarm, affecting the performances of the aircraft, has been generated. This is displayed here in area 400. Performance calculation window 405 is initialized according to the parameters relating to the detected failure in order to lighten the pilot's task as much as possible.

Similarly, the operational documentation relating to the alarms generated is accessible via the OPS LIBRARY application by virtue of the previously defined links. In this way, when the pilot wishes to consult all the elements of the operational documentation relating to an alarm, the pilot starts the OPS LIBRARY application. Following the occurrence of an alarm, the page of an ECAM ALERTS tab of the interface of this application automatically is displayed. This page provides the list of alarms displayed during the flight, for example the F/CTL PRIM 1 FAULT alarm.

Figure 5A:
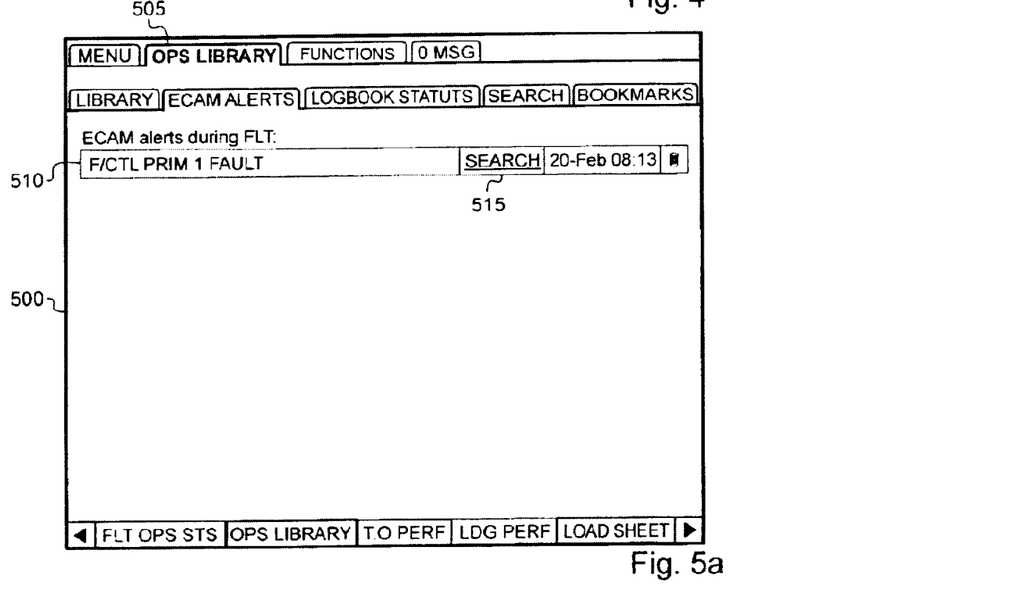
FIGS. 5a, 5b and 5c, illustrates exemplary copies of a screen of the open on-board information system, showing the interface of an application for access to the operational documentation when an alarm has been generated in the FWS.

FIG. 5a illustrates an example of a copy of a screen of the open on-board information system showing the interface of the OPS LIBRARY application when an alarm has been generated. Page 500, corresponding to ECAM ALERTS tab 505, comprises the list of alarms generated, here the F/CTL PRIM 1 FAULT alarm, referenced 510.

The pilot then selects and activates the failure for which he wishes to consult the adjoining operational documentation. Activation is accomplished, for example, by clicking on the SEARCH button bearing the reference 515. Selection preferably is accomplished with the aid of a pointing device such as a mouse, a touch screen or a KCCU (abbreviation for Keyboard Cursor Control Unit in English terminology).

The list of operational manuals containing information items relating to the selected alarm then is provided to the pilot. References to these manuals preferably are displayed in a green color. Other manuals are referenced, for example, in a blue color.

Figure 5B:
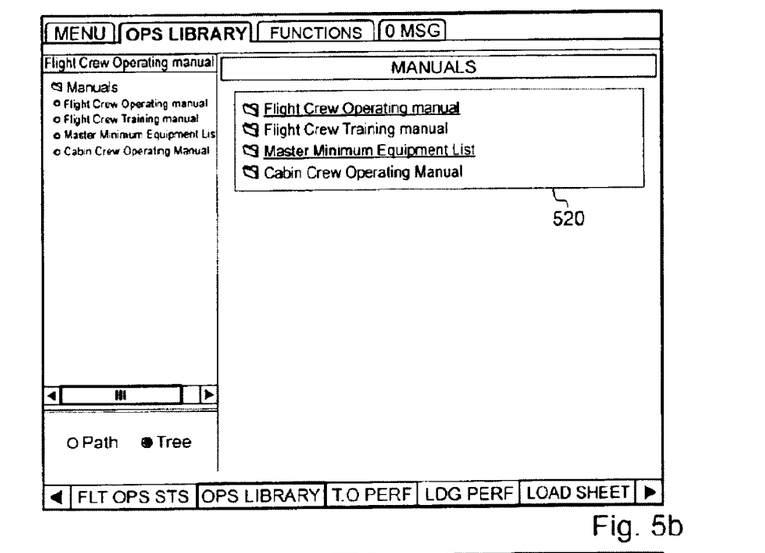

FIG. 5b illustrates a example of a copy of a screen of the open on-board information system showing the interface of the OPS LIBRARY application when an alarm has been generated. List 520 corresponds to the list of available manuals, the manuals making reference to the identified alarm being shown in green (here in underlined text).

According to the context of the flight (preparation of the flight, take-off, cruising phase, landing, etc.), the pilot selects the manual to be consulted and follows the "green line" that enables him to end up at the various pages relating to the alarm generated.

Figure 5C:
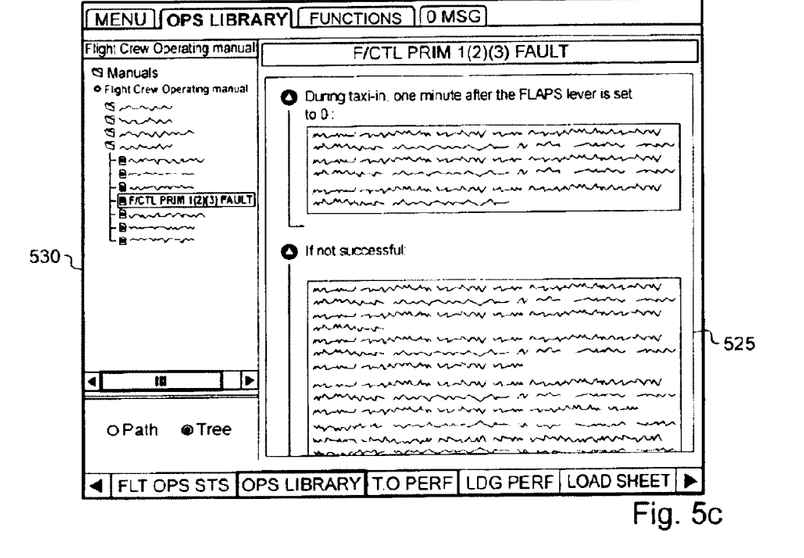

FIG. 5c illustrates an example of a copy of a screen of the open on-board information system showing the interlace of the OPS LIBRARY application when an alarm and a manual have been selected. Window 525 shows a page relating to the alarm generated, here in the FCOM manual, while window 530 indicates the position of this page in the hierarchic structure of the selected manual.

According to a particular embodiment, selection of the information items relating to the alarms generated automatically takes into account the state of the aircraft.

In fact, the procedures to be applied and transmitted by the FWS to the warning display system may differ according to the state of the aircraft at the time of occurrence of the alarm (flight phase, faulty system in the process of being used or not, failure of a third-party system, optional system impacted by the failure installed on the aircraft or not, etc.). The same alarm thus does not always entail exactly the same procedures.

For example, when a fire is detected in a casing of a landing gear, the procedures are not the same if the aircraft is in flight or if it is on the ground.

According to this embodiment, the codes for the alarms generated are transmitted from the FWS to the open on-board information system with codes corresponding to the lines of procedures actually displayed for these alarms. In this way, a selection is made in the displayed manuals in order to automatically identify the conditions involving the lines presented in the warning display system and to mask the others.

The crew then has direct access to the information items relating to the exact situation encountered, the others remaining accessible by opening the masked conditions.

Such a display/masking interface may use in particular the principle of expansion/reduction according to which only the section titles are always displayed, the content of the sections being able to be displayed or masked with the aid of an expand/reduce function shown, for example, with the aid of a triangle placed in front of the title of the section. According to this principle, all the sections are reduced with the exception of those relating to the alarms generated.

Figure 6:
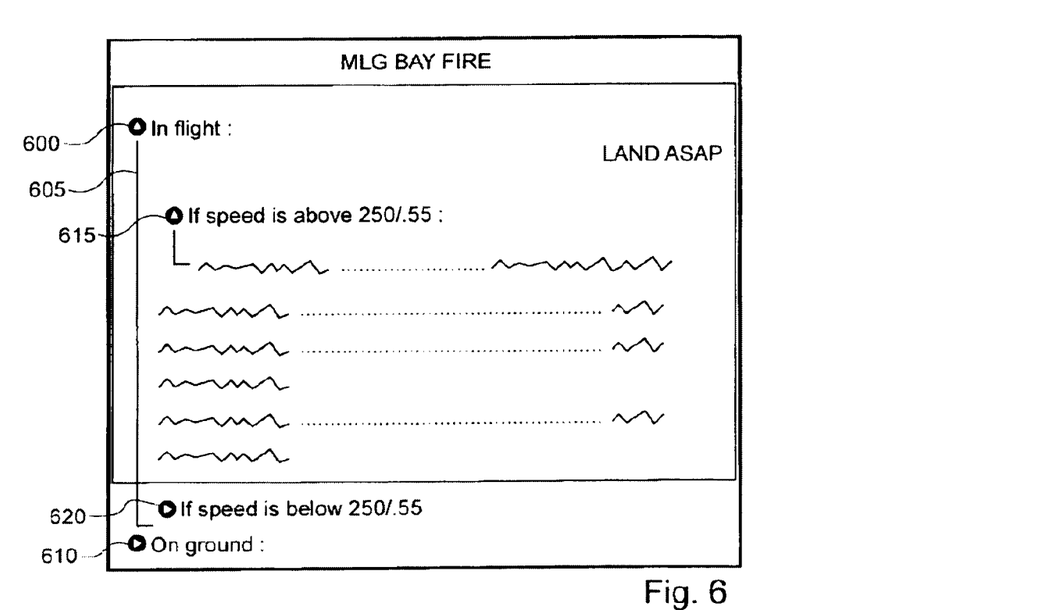
FIG. 6 illustrates an exemplary window of a screen of the open on-board information system showing the interface of an application for access to the operational documentation when an alarm of the fire-in a gear-casing type is generated; and, FIG. 7 schematically illustrates a device adapted for implementing the invention.

FIG. 6 illustrates an exemplary window of a screen of the open on-board information system showing the interface of the OPS LIBRARY application when an alarm of fire-in-a-gear-casing type is detected.

The display here is automatically contextualized according to the state of the aircraft. Since the aircraft here is considered in flight, section 600 relating to the "in flight" condition is expanded, that is to say that its content 605 is at least partially able to be displayed while "on the ground" section 610 is reduced, that is to say that its content is masked. Similarly, assuming that the speed of the aircraft is above 250 knots, subsection 615 "speed above 250 knots" is expanded, while subsection 620 "speed below 250 knots" is reduced.

Such an interface enables the pilot to directly access the useful information items without, for all that, preventing him from accessing other information items.

Similarly, other applications of the open on-board information system may use the information items originating from the FWS and/or from other equipment items in order to optimize their interfaces.

Figure 7:
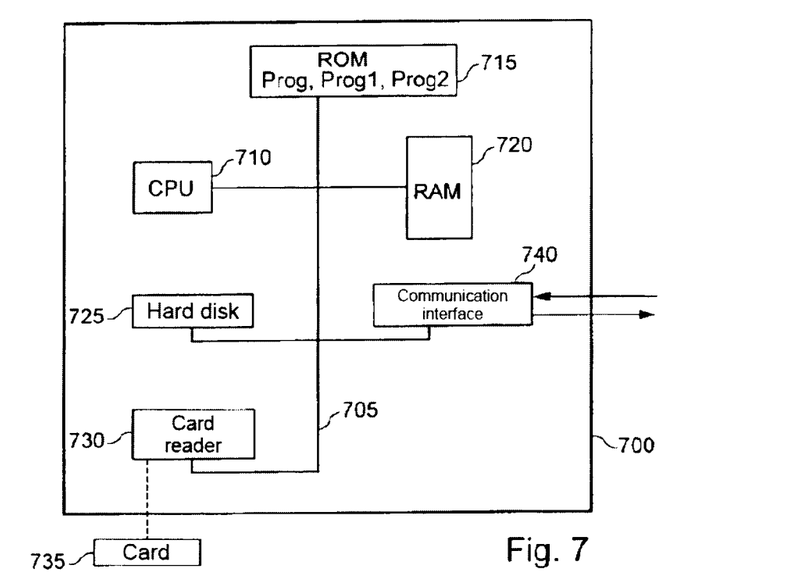

FIG. 7 schematically illustrates a device adapted for implementing the invention. The device shown preferably is a standard device, for example an aircraft data-processing machine or a computer.

Device 700 here comprises an internal communication bus 705 to which there are connected:
  a central processing unit or microprocessor 710 (CPU, abbreviation for Central Processing Unit in English terminology);
  a read-only memory 715 (ROM, acronym for Read Only Memory in English terminology) that can comprise the programs necessary for implementation of the invention;
  a random access or cache memory 720 (RAM, acronym for Random Access Memory in English terminology) comprising registers adapted for recording variables and parameters created and modified in the course of running of the aforesaid programs;
  a communication interface 740 adapted for transmitting and receiving data to and from a communication network, wired or not. Communication interface 740 makes it possible, in particular, to receive data from the avionics.

Device 700 also preferably has the following components:
  a hard disk 725 that can comprise the aforesaid programs and data processed or to be processed according to the invention; and
  a memory card reader 730 adapted for receiving a memory card 735, or any other external data storage system, and reading or writing therein data processed or to be processed according to the invention.

The internal communication bus permits communication and interoperability among the various components included in device 700 or connected thereto. The depiction of the internal bus is not limitative and, in particular, the microprocessor is able to communicate instructions to any component of device 700 directly or via another component of device 700.

The executable code of each program permitting the programmable device to implement the processes according to the invention may be stored, for example, on hard disk 725 or in read-only memory 715.

According to a variant, memory card 735 may contain data, in particular a table of correspondence between the events detected and the commands that may be requested, as well as the executable code of the aforesaid programs which, once read by device 700, is stored on hard disk 725.

According to another variant, the executable code of the programs will be able to be received, at least partially, via first communication interface 740, to be stored in a manner identical to that described above.

More generally, the program or programs will be able to be loaded into one of the storage means of device 700 before being run.

Microprocessor 710 is going to control and direct the execution of the instructions or portions of software code of the program or programs according to the invention, which instructions are stored on hard disk 725 or in read-only memory 715 or else in the other aforesaid storage components. During boot-up, the program or programs that are stored in a non-volatile memory, for example hard disk 725 or read-only memory 715, are transferred to random access memory 720 which then contains the executable code of the program or programs according to the invention, as well as the registers for storing the variables and parameters necessary for implementation of the invention.

The communication apparatus comprising the device according to the invention also may be a programmed apparatus. This apparatus then contains the code of the computer program or programs for example set into an application-specific integrated circuit, also called ASIC (acronym for Application-Specific Integrated Circuit in English terminology).

Naturally, to satisfy specific needs, an individual competent in the field of the invention will be able to apply modifications in the foregoing description.

ATTACHMENT

TABLE 1

| Alarm code | Alarm name | Links | Conditions | Comments |
|---|---|---|---|---|
| 00001 | $Name_1$ | Link1, link2 | $C_1, C_2, C_3$ | Comment |
| ... | ... | ... | ... | ... |
| i | $Name_x$ | $Link_x$ | $C_x, C_y$ | Comments |

The invention claimed is:

1. A method to access documentation of an aircraft in the aircraft, the documentation including at least one document modifiable independently of a manufacturer of the aircraft, the method comprising:
receiving, using a processor, at least one indication relating to at least one alarm generated by avionics of the aircraft;
extracting, using the processor, at least one datum relating to the at least one alarm, the at least one datum including a user-activatable link to at least one element of the documentation in the aircraft; and
displaying the extracted at least one datum including the user-activatable link to at least one element of the documentation in the aircraft,
wherein said extracting and displaying the at least one datum including the user-activatable link are performed based on a documentary unit stored in memory, the documentary unit providing a relationship between the at least one indication and the at least one datum for extraction and display of the at least one datum.

2. The method according to claim 1, further comprising:
identifying at least one part of the at least one document of the documentation relating to the at least one alarm based on the at least one indication received; and
accessing the at least one part of the at least one document.

3. The method according to claim 1, wherein the at least one datum is displayed among a plurality of data including user-activatable links to the documentation, the at least one datum being displayed so as to be recognized by an operator of the aircraft.

4. The method according to claim 1, further comprising authenticating the at least one indication received.

5. The method according to claim 1, wherein the at least one indication is received via a unidirectional link.

6. The method according to claim 1, wherein the at least one datum includes an information item relating to conditions having led to the generation of the at least one alarm.

7. The method according to claim 1, wherein the documentation includes at least one of a Flight Crew Operating Manual (FCOM), a Minimum Equipment List (MEL), a Configuration Deviation List (CDL), an operator manual, and performance calculation elements.

8. A non-transitory computer-readable storage medium storing computer-readable instructions that, when executed by a computer, cause the computer to perform the method according to claim 1.

9. The method according to claim 1,
wherein the at least one indication includes an alarm code, and
wherein said extraction includes a comparison of the received alarm code with one or more alarm codes of the documentary unit, the documentary unit including the one or more alarm codes, a name associated with each of the alarm codes, conditions that triggered the alarm, and comments that contribute to a pilot's understanding of any action or actions to be performed.

10. The method according to claim 1, wherein the extracted and displayed at least one datum includes the user-activatable link and at least one additional link, the user-activatable link being made active and said at least one additional link being made inactive based on a context of an aircraft flight phase.

11. A device to access aircraft documentation, the device comprising:
flight warning circuitry configured to generate, based on a detected failure or anomaly, a first signal and a second signal;
warning display circuitry configured to receive the first signal from said flight warning circuitry and to display, based on the first signal, procedures to be performed in response to the detected failure or anomaly, the displayed procedures being displayed in response to user-initiated access of at least one user-activatable link; and
information circuitry configured to receive the second signal from said flight warning circuitry,
wherein the user-initiated access of the at least one user-activatable link is based on a documentary unit stored in memory, the documentary unit providing a relationship between the second signal and the at least one user-activatable link.

12. The device according to claim 11, wherein the device is provided on board an aircraft.

13. The device according to claim 11, further comprising: extracting circuitry configured to extract for display by said warning display circuitry at least one datum relating to at least one alarm associated with the detected failure or anomaly, the at least one datum including the at least one user-activatable link.

14. The device according to claim 11,
wherein the second signal includes an alarm code, and
wherein the user-initiated access to the at least one user-activatable link includes a comparison of the received alarm code with at least one alarm code of the documentary unit, the documentary unit including comments that contribute to a pilot's understanding of any restrictions generated based on a match for the comparison of the received alarm code with the at least one alarm code of the documentary unit.

15. A system on-board an aircraft to access documentation associated with the aircraft, the system comprising:
a flight warning subsystem configured to generate, based on a detected failure or anomaly, a first signal and a second signal;
a warning display subsystem configured to receive the first signal from said flight warning subsystem and to display, based on the first signal, procedures to be performed in response to the detected failure or anomaly, the displayed procedures being displayed in response to user-initiated access of at least one user-activatable link; and
an information subsystem configured to receive the second signal from said flight warning subsystem,
wherein the user-initiated access of the at least one user-activatable link is based on a documentary unit stored in memory, the documentary unit providing a relationship between the second signal and the at least one user-activatable link.

16. The system according to claim 15, wherein the second signal includes a code corresponding to an alarm generated based on the detected failure or anomaly.

17. The system according to claim 15, wherein said warning display subsystem displays a state of the aircraft based on the first signal from said flight warning subsystem.

18. The system according to claim 15, further comprising:
a unidirectional link connecting said flight warning subsystem and said information subsystem and including a communication monitoring component configured to prevent data transmission from said information subsystem to said flight warning subsystem.

19. The system according to claim 18, wherein the unidirectional link includes a communication monitoring component configured to prevent data from being transmitted to avionics of the aircraft from an open on-board information system comprised of a database storing the documentation.

20. The method according to claim 1, wherein the at least one indication includes an alarm code.

* * * * *